April 23, 1968   P. N. PETERSEN   3,379,864
EDUCATIONAL ELECTRIC FLUID FLOW ANALYZER
Filed June 7, 1963   2 Sheets-Sheet 1
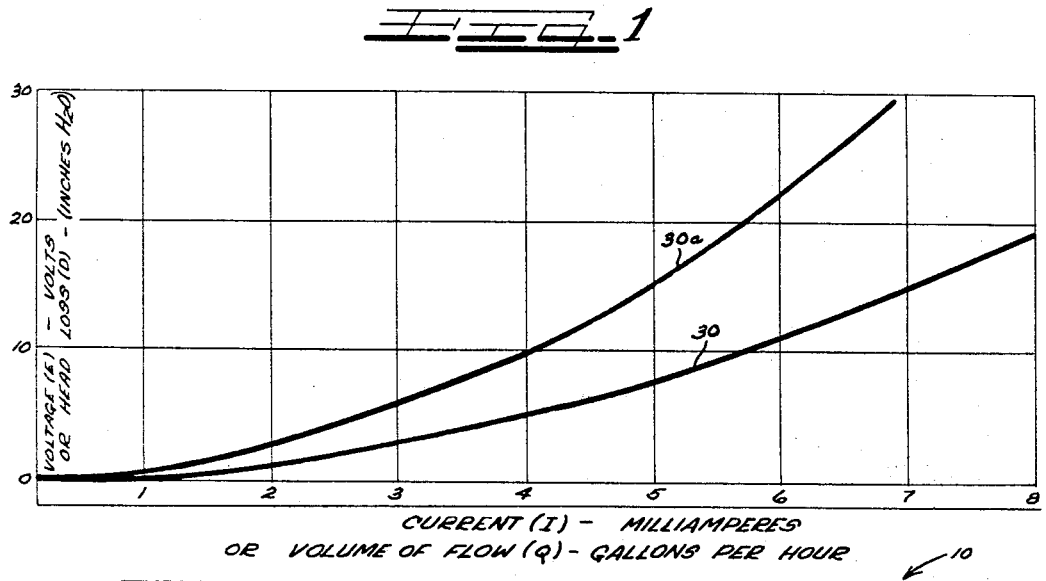
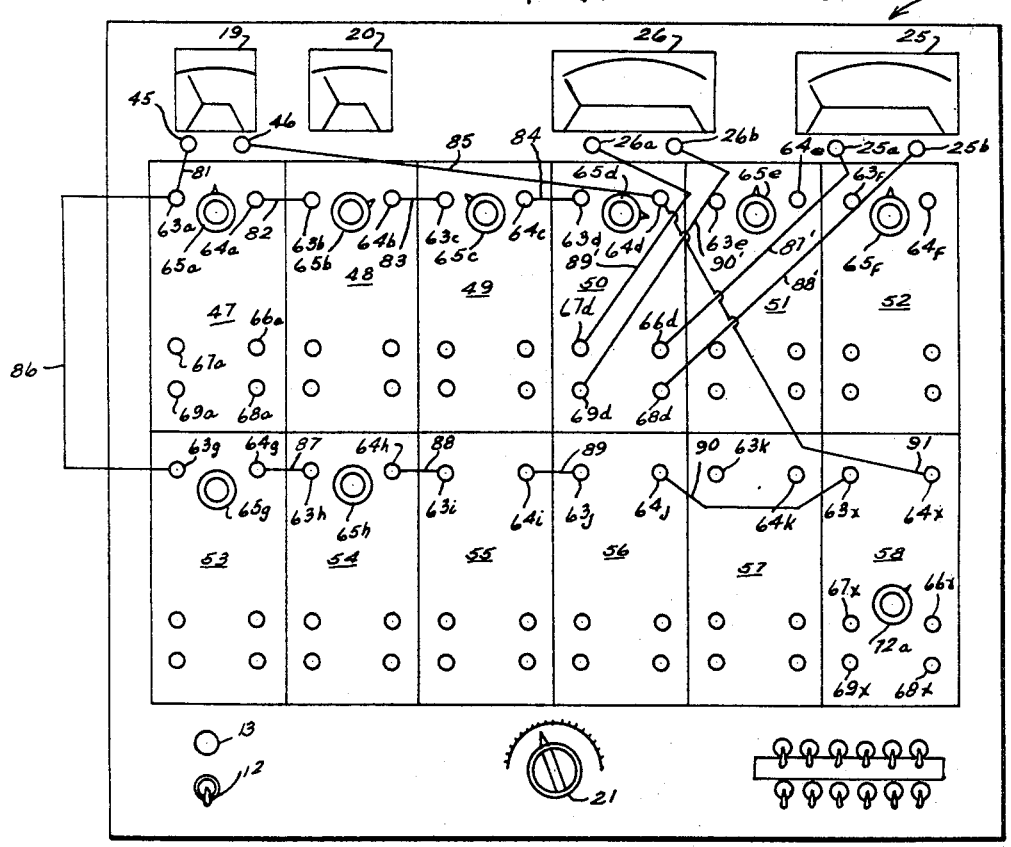
INVENTOR.
Dieter N. Petersen April 23, 1968 P. N. PETERSEN 3,379,864
EDUCATIONAL ELECTRIC FLUID FLOW ANALYZER
Filed June 7, 1963 2 Sheets-Sheet 2
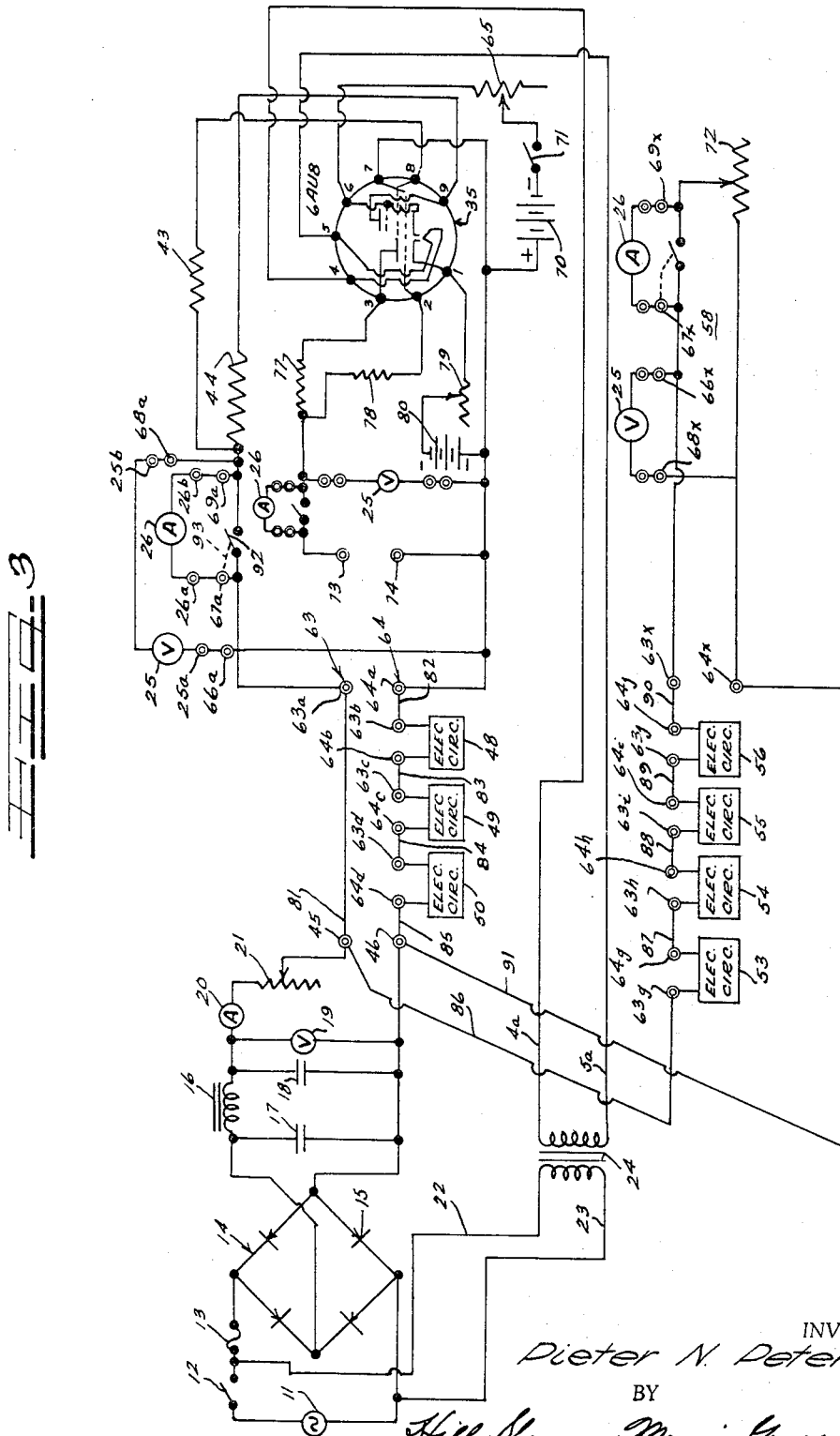
INVENTOR.
Dieter N. Petersen
BY
Hill, Sherman, Meroni, Gross & Simpson
ATTORNEYS United States Patent Office 3,379,864
Patented Apr. 23, 1968

3,379,864
EDUCATIONAL ELECTRIC FLUID
FLOW ANALYZER
Pieter N. Petersen, Pompano Beach, Fla., assignor to
Scott-Engineering Sciences Corporation, Pompano
Beach, Fla., a corporation of Florida
Filed June 7, 1963, Ser. No. 286,419
9 Claims. (Cl. 235—151.34)

This invention relates to educational apparatus for demonstrating fluid pressure and fluid flow conditions in networks of fluid conduits and particularly relates to electrical apparatus for simulating a variety of such networks as a laboratory tool for students.

It is an object of the present invention to provide a fluid circuit demonstration apparatus adapted to readily demonstrate to the student the pressure and flow conditions at various points in any of a large number of fluid networks.

It is a further object of the invention to provide such fluid circuit demonstration apparatus for educational purposes wherein the individual units of the apparatus may be readily adjusted to simulate fluid conduits of different lengths.

Another object of the invention is to provide a novel electric circuit for simulating pressure and flow conditions in a fluid conduit.

Still another object of the invention is to provide a compact and versatile educational fluid circuit demonstration apparatus which is quickly and conveniently set up as part of a laboratory course of study while requiring a minimum number of parts and presenting a minimum space requirement consistent with the purpose of demonstration.

A still further object of the present invention is to provide an electric fluid flow analyzer for electrically simulating flow and pressure conditions in a fluid piping circuit and which may be used as a tool in solving problems involving fluid flow.

Other objects, features and advantages of the present invention will be apparent from the following detailed description taken in connection with the accompanying drawings, in which:

FIGURE 1 illustrates the variation of head loss as a function of volume of flow in a fluid conduit of the type to be simulated in the present invention in terms of voltage as a function of current;

FIGURE 2 shows a preferred arrangement of parts for an educational electric fluid flow analyzer in accordance with the present invention; and FIGURE 3 is an electric circuit diagram and showing the various electric circuits of the apparatus of FIGURE 2, interconnected in the same way as illustrated in FIGURE 2, by way of example.

The preferred embodiment of the present invention illustrated in the drawings is an analog device designed for electrical simulation of flow and pressure conditions in a fluid piping circuit. The analyzer may be used as a tool in solving problems involving fluid flow in which input and read-out are in terms analogous to flow and pressure. Observed readings may be interpreted in terms of resistance or friction loss values. The velocity of fluid flow in a pipe or other channel and head loss are related to each other by an equation of the form D equals $KV^2$ where D is head loss due to friction and V is velocity and K is a constant. Such an equation is represented by a parabolic curve. In a pipe of constant cross-sectional area the volume of flow per unit time of a liquid varies directly with the velocity so that D equals $CQ^2$ where Q is the volume of flow per unit time. Curves 30 and 30a in FIGURE 1 represent plots of this equation for different values of the constant C.

There are certain electrical concepts which have been found to be analogous to counterparts in fluid flow. In the preferred embodiment of the present invention, current (I) is to be analogous to flow per unit time (Q), and voltage (E) is to be analogous to head loss due to friction (D). The familiar relationship in electric circuits between current and voltage is expressed in the equation E equals IR where I is the current flowing through a resistance R and E is the observed voltage across the resistance. It is apparent that this simple linear relationship between current and voltage is not suitable for simulating the relationship between head loss D and volume of flow Q in a pipe of constant cross section.

A preferred embodiment of fluid circuit demonstration apparatus in accordance with the present invention is indicated generally by the reference numeral 10 in FIGURE 2 and comprises a series of electric circuits such as indicated in FIGURE 3 for electrically simulating the curves 30 and 30a shown in FIGURE 1.

Referring to FIGURE 3, a conventional 115-volt 60-cycle power supply is indicated at 11 which is connected to the circuit of FIGURE 3 including a switch 12, fuse 13 and a silicon diode full wave rectifier 14 including diodes 15. The unidirectional output from rectifier 14 is supplied to the input of a filter including choke 16 and filter condensers 17 and 18. A volt meter 19 indicates the output voltage from the filter and an ammeter 20 indicates the output current. A variable resistor 21 is included at the output of the power supply.

The source 11 is also utilized in conjunction with lines 22 and 23 to energize a filament transformer 24 whose secondary is connected to the filament terminals 4 and 5 of a vacuum tube socket by lines 4a and 5a.

Reference numerals 25 and 26 represent a volt meter and ammeter having terminals 25a, 25b and 26a, 26b for connection into the electric circuit at any of a substantial number of points. It will be noted that only a single volt meter 25 and ammeter 26 are shown in FIGURE 2 in the actual physical apparatus, but in FIGURE 3, the volt meter 25 and ammeter 26 have been shown at a plurality of different possible locations where they may be connected in the circuit. Actually, of course, the volt meter and ammeter could be connected to the points indicated in succession, but not simultaneously.

After trial of a substantial number of circuit arrangements for simulating the curves 30a and 30b of FIGURE 1, the preferred circuit associated with the pentode section of tube 35 was discovered which provides a voltage readin gat terminals 66a and 68a and provides a current reading at terminals 67a and 69a which varies as a function of the voltage reading substantially as indicated for the hydraulic curves 30 and 30a depending upon the setting of resistor 65.

Referring to the circuit associated with the pentode section of tube 35, it will be observed that a resistor 43 connects the second grid terminal 8 with an input terminal 63a, while a resistor 44 connects plate terminal 9 of the tube with the input terminal 63a. Input terminal 64a is connected directly with terminal 7 of the tube associated with the first or control grid. Terminal 64a is connected to terminal 6 of the tube through a bias supply 70, switch 71 and variable resistor 65. Terminal 6 of the tube connects with the third grid and with the cathode of the pentode section.

As an illustration of one embodiment represented in FIGURE 2 of the present application, each of the subpanels 47 through 54 may be associated with a pentode circuit such as just described with respect to FIGURE 3. The jacks corresponding to terminals 63 and 64 are indicated at 63a through 63h and at 64a through 64h in FIGURE 2. Similarly the control knobs for potentiometers such as indicated at 65 are designated by reference numerals 65a through 65h in FIGURE 2. Subpanels 55, 56 and 57 may have electric circuits associated with terminals 63i–63k and 64i–64k thereof substantially identical to that associated with the pentode section of tube 35 in FIGURE 3 except that potentiometer 65 is replaced by a fixed resistance so that there is no adjusting knob such as indicated at 65a. Subpanel 58 may have terminals 63x and 64x and a variable resistance 72, FIGURE 3, connected therebetween and having an actuating knob 72a as indicated in FIGURE 2. Each of the electric circuits associated with the respective subpanels is provided with volt meter terminals such as 66a and 68a and ammeter terminals 67a and 69a. Thus, subpanel 50 is indicated as having volt meter terminals 66d, 68d and ammeter terminals 67d, 69d. Similarly subpanel 58 is provided with volt meter terminals 66x, 68x and ammeter terminals 67x, 69x to which volt meter 25 and ammeter 26 may be connected.

FIGURE 3 also includes a resistor 77 connected between input terminal 73 and plate terminal No. 3 of the triode section, and a resistor 78 conected between the input terminal 73 and control grid terminal No. 2 of the triode section. A variable resistor 79 and a bias voltage source 80 are connected in series between input terminal 74 and cathode terminal No. 1 of the triode section of the tube.

As indicated in FIGURE 2, a substantial number of cords such as indicated at 81 through 91 may be utilized to interconnect the power output terminals 45, 46 with the input terminals of the various subpanels. Additional cords such as indicated at 87', 88', 89' and 90' may be utilized to interconnect the voltage and current terminals of the respective subpanels with the volt meter terminals 25a, 25b and ammeter terminals 26a and 26b. The subpanel interconnections with respect to the input terminals have also been indicated diagrammatically in FIGURE 3.

It will be apparent that a very wide variety of hydraulic circuits may be simulated by utilizing cords to correspondingly interconnect the various subpanels. The voltage and current conditions at any of the subpanel electric circuits may be sensed by suitably connecting the patch cords associated with volt meter 25 and ammeter 26.

It will be apparent that subpanels 53 through 57 may be provided by the circuits associated with triode sections such as shown in FIGURE 3 having output terminals 73 and 74. This reduces the practical size of the apparatus shown in FIGURE 2 to two-thirds its value where only pentode sections of the tubes are utilized for the respective subpanels.

It will, of course, be understood that preferably at the back of the subpanels 47–58 are mounted the various components of the associated electric circuits such as tube 35, the resistance elements, and variable resistor 65 where included in the respective circuits. The subpanels may thus represent a wide range of diameters and lengths of pipe. For example, the three non-variable panels 55, 56 and 57 may represent fixed elements such as a related size of pipe fitting or valve. In general, the terminals to receive the cords such as 81–91 may comprise any suitable quick-disconnect type of jack. The ammeter jacks such as indicated at 67a in FIGURE 3 may include suitable switch means such as indicated at 92 in series between terminals 67a and 69a and so arranged that when a cord plug is connected with the jack 67a, for example, switch 92 is automatically opened as indicated by the mechanical coupling line 93.

The subpanel 58 circuit may be included in any circuit as the final element, acting like a control valve. Manipulation of knob 72a, FIGURE 2, serves to increase or decrease the circuit resistance introduced by resistor 72, FIGURE 3. For a given input voltage an increase in resistance has the effect of decreasing the current. The resistor 72 therefore acts like a valve at the terminus of a hydraulic system. When this valve is partially closed, increasing the resistance, the flow is correspondingly reduced.

It is evident that a large number of series and parallel circuits may be wired using elements such as herein disclosed.

By way of example and not of limitation, other sharp-cutoff pentodes such as the 6AU6 and the pentode section of the 6AW8 may be substituted for the pentode section of the 6AU8 tube shown in the illustrated embodiment. Similarly, high-mu triode sections such as that of the 6AW8 may be substituted for the medium-mu triode section of the 6AU8 tube shown in the illustrated embodiment.

By way of example only and not of limitation, the following are suitable circuit values for providing operation substantially in accordance with the curves of FIGURE 1.

*Example A*

Tube Type—pentode section of 6AU8; $R_p$ (resistor 44), 2200 ohms; $Rg_2$ (resistor 43), 820 ohms; $R_k$ (variable resistor 65), 0–2000 ohms; $E_k$ (bias source 70 with polarity indicated), −1.5 volts; circuit, series connection of circuits such as indicated for circuits 47, 48, 49 and 50 in FIGURE 3 (each receiving a fraction of the power supply voltage at terminals 45, 46).

*Example B*

Tube Type—pentode section of 6AU8; $Rp$, 2700 ohms; $Rg_2$, 47 ohms; $R_k$, 2–2000 ohms; $e_k$, −1.5 volts; circuit, parallel connection of circuits (each receiving the full output voltage, for example 8 volts, from the output terminals of the power supply and receiving a fraction of the total current, for example receiving about 5 milliamperes in conformity with curve 30 in FIGURE 1).

*Example C*

Tube Type—pentode section of 6AW8; $Rp$, 390 ohms; $Rg_2$, 820 ohms; $R_k$, 0–2000 ohms; $E_k$, −1.5 volts; series and parallel connections of successive circuits.

*Example D*

Tube Type—pentode section of 6AW8; $Rp$, 330 ohms; $Rg_2$, 120 ohms; $R_k$, 0–2000 ohms; $E_k$, −1.5 volts; series connection of successive circuits.

*Example E*

Tube Type—pentode section of 6AW8; $Rp$, 330 ohms; $Rg_2$, 120 ohms; $R_k$, 0–2000 ohms; $e_k$, −1.5 volts; parallel connection of successive circuits.

*Example F*

Tube Type—pentode section of 6AW8; $Rp$, 270 ohms; $Rg_2$, 100 ohms; $R_k$, 0–2000 ohms; $E_k$, −1.5 volts; parallel connection of successive circuits.

*Example G*

Tube Type—triode section of 6AU8; $Rp$ (resistor 77), 2200 ohms; $Rg$ (resistor 78), infinite (grid terminal No. 2 connected to terminal 74, FIGURE 3, and substantially isolated from terminal 73); series connection of successive circuits.

*Example H*

Tube Type—triode section of 6AW8; $Rp$, 1500 ohms, grod terminal No. 2 connected to terminal 74, FIGURE 3; $R_k$, 0–2000 ohms; $E_k$, −1.5 volts; series and/or parallel connections of successive circuits.

*Example I*

Tube Type—triode section of 6AW8; $Rp$ (resistor 77), 47 ohms; $Rg$ (resistor 78), 330 ohms; $R_k$ (variable resistor 79), 0–2000 ohms; $E_k$ (bias source 80 with polarity shown in FIGURE 3), −1.5 volts; series connection of successive circuits.

Example J

Tube Type—triode section of 6AU8; $R_p$, 47 ohms; $R_g$, 820 ohms; $R_k$, 0–2000 ohms; $E_k$, −1.5 volts; parallel connection of successive circuits (each receiving the full output voltage, for example 15 volts, from the output terminals of the power supply and receiving a fraction of the total current, for example receiving about 5 milliamperes in conformity with curve 30a in FIGURE 1).

Example K

Tube Type—triode section of 6AW8; $R_p$, 320 ohms; $R_g$, 120 ohms; $R_k$, 0–2000 ohms; $E_k$, −1.5 volts; parallel connection of successive circuits.

Example L

Tube Type—triode section of 6AW8; $R_p$, 10 ohms; grid terminal No. 2 connected to terminal 74, FIGURE 3; $R_k$, 0–2000 ohms; $E_k$, −1.5 volts; parallel connection of successive circuits.

Example M

Tube Type—pentode—6AU6; $R_p$, 270 ohms; $R_{g_2}$, 100 ohms; $R_k$, 0–2000 ohms; $E_k$, −1.5 volts; parallel connection of successive circuits.

In each of the foregoing examples, the power supply may be as shown in FIGURE 3 except that the fixed terminals of potentiometer 21 may be connected across output capacitor 18 to provide the variable voltage from the power supply. In other words, the upper terminal and movable contact of potentiometer 21 are connected as shown in FIGURE 3, but the lower terminal is connected with the line leading to terminal 46, rather than being unconnected. In the specific examples given, the potentiometer across the output of the power supply had a maximum resistance of 3500 ohms. There was thus a resistance of 3500 ohms connected across capacitor 18. In each example, the rated filament voltage of substantially 6.3 volts was supplied to the filaments of the tubes in parallel from the secondary of transformer 24.

SUMMARY OF OPERATION

In operation, the control knobs such as 65a–65h for the panels to be employed in a given circuit are set to the values corresponding to the particular lengths of piping to be simulated. The subpanels are then interconnected by means of the patch cords so that the electric circuit simulates the hydraulic circuit to be studied. Switch 12 is then closed, and potentiometer 21 adjusted to provide the desired input current to the system. The voltage and current conditions at any desired point in the circuit may be determined by connecting the volt meter 25 and ammeter 26 to such points. For example, volt meter 25 and ammeter 26 have been shown as connected to points 66x, 68x and 67x, 69x of circuit 58 in FIGURE 3. The control 72a, FIGURE 2, may be adjusted to vary the potentiometer 72, FIGURE 3, which simulates a control valve.

It will be apparent that many modifications and variations may be effected without departing from the scope of the novel concepts of the present invention.

I claim as my invention:

1. A fluid circuit demonstration apparatus for educational purposes comprising
   (a) a panel having voltage and current indicating meters mounted thereon and comprising a series of subpanels each for simulating at least one element of a fluid circuit,
   (b) said subpanels having respective sets of electric input terminals and having respective fluid conduit simulating electric circuits electrically connected with said input terminals,
   (c) said fluid conduit simulating electric circuits each providing a head loss simulating voltage E and a volume of flow simulating current I related substantially in accordance with the equation E equals $CI^2$,
   (d) certain of said fluid conduit simulating electric circuits having variable length fluid conduit simulating means therein selectively adjustable for varying said head loss simulating voltage E and said volume of flow simulating current I by effectively changing the value of the constant C in the equation E equals $CI^2$,
   (e) said variable length fluid conduit simulating means each having a manually operable control providing for manual adjustment thereof and mounted at the associated subpanel,
   (f) means for selectively connecting said input terminals of the respective subpanels in an electric circuit to simulate a corresponding arrangement of fluid conduits, and
   (g) means for selectively connecting said voltage and current indicating meters with the electric circuits of any of a plurality of said subpanels to register the values of voltage E and current I at such subpanels.

2. An electric circuit for simulating the relationship between head loss D and volume of flow Q in a fluid circuit as represented by the equation D equals $DQ^2$ for use in a fluid circuit demonstration apparatus for educational purposes, comprising
   (a) voltage input terminals for connection to a source of direct current voltage,
   (b) a vacuum tube having a pentode section with a cathode, plate, and first, second and third grids,
   (c) a plate resistor connected between one of said input terminals and said plate,
   (d) a second resistor connected between the one input terminal and said second grid,
   (e) means supplying a negative bias voltage to said cathode and said third grid relative to said first grid,
   (f) means for connecting the other of said input terminals to the first control grid, and
   (g) means comprising the values of said resistors and bias voltage for providing a total input current I which is related to the voltage E applied to said input terminals by the relationship E equals $C'I^2$ where $C'$ is a constant.

3. An educational laboratory demonstration apparatus for electrically simulating flow and pressure conditions in fluid piping circuits comprising
   (a) a panel having electric current and voltage measuring devices disposed thereon and comprising a plurality of subpanels disposed in adjacent relation over the front face of said panel,
   (b) said measuring devices having indicating means visible at the front face of said panel and having respective sets of jacks connected to the terminals thereof and accessible from the front face of said panel,
   (c) a plurality of said subpanels having a pair of input jacks, a pair of voltage jacks and a pair of current jacks accessible at the front face of said panel,
   (d) a plurality of said subpanels each having a fluid flow simulating electric circuit providing a current I as observed at the current jacks thereof related to the voltage E observed at the voltage jacks thereof in accordance with the relationship E equals $CI^2$, and
   (e) means for selectively interconnecting the input jacks of the respective subpanels to correspond to any of a plurality of fluid networks to be simulated, and
   (f) means for selectively connecting the electric current and voltage measuring devices to any of the respective current jacks and voltage jacks of said subpanels.

4. A fluid circuit demonstration apparatus for educational purposes comprising (a) a series of subpanels each for simulating at least one element of a fluid circuit,
(b) said subpanels having respective sets of electric input terminals and having respective fluid conduit simulating electric circuits electrically connected to said input terminals,
(c) said fluid conduit simulating electric circuits each including a non-linear device having an input voltage-current characteristic substantially in accordance with the equation E equals $CI^2$ where E is the voltage applied to the device and I is the current flow through the device and C is a constant, and
(d) means for selectively interconnecting the input terminals of the respective electric circuits to simulate any of a plurality of fluid networks.

5. An electric circuit for simulating the relationship between head loss D and volume of flow Q in a fluid conduit as represented by the equation D equals $CQ^2$ for use in a fluid circuit demonstration apparatus for educational purposes comprising (a) a vacuum tube having a pentode section with a cathode, plate, first, second and third grids and having a triode section with a cathode, plate and control grid,
(b) a pentode section electric circuit including voltage input terminals, a plate resistor connected between one of said input terminals and the plate of the pentode section, a second resistor connected between the one input terminal and the second grid of the pentode section, and means for supplying a negative bias voltage to the cathode and third grid of the pentode section with respect to the cathode of the pentode section, and means for connecting the other of the voltage input terminals to the first grid of the pentode section,
(c) a triode section electric circuit having voltage input terminals, a plate resistor connected between one of the input terminals and the plate of the triode section, a second resistor connected between the one input terminal and the control grid of the triode section, means for supplying a negative bias voltage between the other of said input terminals of the triode section circuit and the cathode of the triode section, and resistors interposed between the one input terminal of the triode section circuit and the plate and second grid of the pentode section of said tube, and
(d) at least said pentode section electric circuit having an input current I related to the voltage E applied to the input terminals of the pentode section electric circuit by the relationship E equals $CI^2$ where C is a constant.

6. A fluid circuit demonstration apparatus for educational purposes comprising (a) a panel having voltage and current indicating meters mounted thereon,
(b) said panel having a plurality of subpanels each comprising modules for simulating at least one element of a fluid circuit and said subpanels having respective sets of electric input terminals and having respective fluid conduit simulating electric circuits electrically connected with said input terminals,
(c) said subpanels having head loss simulating voltage terminals and volume of flow simulating current terminals connected with the respective electric circuits, and said electric circuits providing a voltage variation at the voltage terminals and a current variation at the current terminals which are related substantially as head loss and volume of flow in respective elements of a fluid circuit,
(d) means for selectively connecting said input terminals of the respective subpanels in an electric network to simulate a corresponding arrangement of fluid conduits, and
(e) means for selectively connecting the voltage and current meters with the voltage and current terminals of any of a plurality of said subpanels.

7. A fluid circuit demonstration apparatus for educational purposes comprising (a) a panel having voltage and current indicating meters mounted thereon,
(b) said panel having a plurality of subpanels each comprising modules for simulating at least one element of a fluid circuit and said subpanels having respective sets of electric input terminals and having respective fluid conduit simulating electric circuits electrically connected with said input terminals,
(c) said subpanels having head loss simulating voltage terminals and volume of flow simulating current terminals connected with the respective electric circuits, and said electric circuits providing a voltage variation at the voltage terminals and a current variation at the current terminals which are related substantially as head loss and volume of flow in respective elements of a fluid circuit,
(d) means for selectively connecting said input terminals of the respective subpanels in an electric network to simulate a corresponding arrangement of fluid conduits, and
(e) means for selectively connecting the voltage and current meters with the voltage and current terminals of any of a plurality of said subpanels,
(f) said electric circuits comprising amplifiers including the pentode section of a vacuum type operating with a substantial positive voltage applied to the control grid thereof with respect to the cathode thereof.

8. An electric circuit for simulating the relationship between head loss D and volume of flow Q in a fluid circuit as represented by the equation D equals $CQ^2$ for use in a fluid circuit demonstration apparatus for educational purposes, comprising (a) voltage input terminals for connection to a source of direct current voltage,
(b) non-linear fluid circuit simulating means comprising vacuum tube means having its plate and control grid connected with said voltage input terminals and having its cathode receiving a negative bias relative to said control grid,
(c) said fluid circuit simulating means having voltage terminals connected in circuit with said vacuum tube means to provide a voltage in accordance with the variation in plate-cathode voltage of said tube means and having current terminals connected in circuit with said tube means to provide a current in accordance with the variation in plate current of said tube means, and
(d) said tube means being operated to provide a voltage E at the voltage terminals which varies with current I at the current terminals in accordance with the equation E equals $KI^2$ where K is a constant, to simulate the relationship between head loss and volume of flow in a fluid circuit.

9. An educational laboratory demonstration apparatus for electrically simulating flow and pressure conditions in fluid piping circuits comprising (a) a panel having electric current and voltage measuring devices disposed thereon and comprising a plurality of subpanels disposed in adjacent relation over the front face of said panel,
(b) said measuring devices having indicating means visible at the front face of said panel and having respective sets of jacks connected to the terminals thereof and accessible from the front face of said panel,
(c) a plurality of said subpanels having a pair of input jacks, a pair of voltage jacks and a pair of current jacks accessible at the front face of said panel, (d) a first series of said subpanels having fluid flow simulating electric circuits connected with the respective input jacks and voltage jacks and current jacks of respective ones of said subpanels and including the pentode sections of respective vacuum tubes operated to provide a current I as observed at the current jacks related to the voltage E observed at the voltage jacks of the respective subpanels in accordance with the relationship E equals $CI^2$ where C is a constant, (e) a further series of said subpanels having fluid flow simulating electric circuits connected with respective input jacks and voltage jacks and current jacks of respective ones of the subpanels and including the triode sections of the respective type vacuum tubes, (f) means for selectively interconnecting the input jacks of the respective series of subpanels to correspond to any of a plurality of fluid networks to be simulated, and (g) means for selectively connecting the electric current and voltage measuring devices to any of the respective current jacks and voltage jacks of said subpanels.

References Cited

UNITED STATES PATENTS

| | | | |
|---|---|---|---|
| 2,702,857 | 2/1955 | Berger et al. | 235—193.5 X |
| 2,991,936 | 7/1961 | Baldwin et al. | 235—184 |
| 3,028,091 | 4/1962 | Johnson et al. | 235—184 |
| 3,106,638 | 10/1963 | Braun | 235—184 X |

FOREIGN PATENTS 120,686   6/1957   Russia.

MALCOLM A. MORRISON, *Primary Examiner.*

I. KESCHNER, J. F. RUGGIERO, *Assistant Examiners.*

UNITED STATES PATENT OFFICE
CERTIFICATE OF CORRECTION

Patent No. 3,379,864            April 23, 1968

Pieter N. Petersen

It is certified that error appears in the above identified patent and that said Letters Patent are hereby corrected as shown below:

Column 2, line 49, "readin gat" should read -- reading at --.
Column 3, line 22, "conected" should read -- connected --.
Column 4, line 29, "$R_k$, 2-2000 ohms" should read -- $R_k$, 0-2000 ohms --; line 66, "grod" should read -- grid --. Column 6, line 26, "$DQ^2$" should read -- $CQ^2$ --.

Signed and sealed this 14th day of October 1969.

(SEAL)
Attest:

Edward M. Fletcher, Jr.            WILLIAM E. SCHUYLER, JR.
Attesting Officer            Commissioner of Patents